United States Patent
Gammenthaler, Jr. et al.

(10) Patent No.: US 7,197,032 B1
(45) Date of Patent: Mar. 27, 2007

(54) SWITCH ARCHITECTURE USING MULTIPLE CROSSBARS

(75) Inventors: Robert S. Gammenthaler, Jr., Frisco, TX (US); Ignacio A. Linares, Plano, TX (US); James C. McKinley, Frisco, TX (US); Teck Q. Chin, Richardson, TX (US); Gerald R. Dubois, Lucas, TX (US)

(73) Assignee: Alcatel Lucent, Paris (FR)

( * ) Notice: Subject to any disclaimer, the term of this patent is extended or adjusted under 35 U.S.C. 154(b) by 1252 days.

(21) Appl. No.: 09/927,190

(22) Filed: Aug. 10, 2001

(51) Int. Cl.
*H04L 12/50* (2006.01)
(52) U.S. Cl. .................... 370/386; 370/388
(58) Field of Classification Search .............. 370/406, 370/380, 386, 388
See application file for complete search history.

(56) References Cited

U.S. PATENT DOCUMENTS

| | | | |
|---|---|---|---|
| 4,817,082 A * | 3/1989 | Orsic | 370/389 |
| 5,559,971 A * | 9/1996 | Hsieh et al. | 710/317 |
| 5,617,413 A | 4/1997 | Monacos | |
| 6,134,357 A | 10/2000 | MacDonald | |

OTHER PUBLICATIONS

Hoebelheinrich, Randy et al, "Multiple Crossbar Network-A Switched High Speed Local Network" Local Computer Networks, 1989, Proceedings 14th Conference on Mineapolis, MN, USA Oct. 10-12, 1989, los Alamitos, CA, USA, IEEE Coput. Soc., XP010017051, ISBN: 0-8186-1968-6.

* cited by examiner

*Primary Examiner*—Doris H. To
*Assistant Examiner*—Steve Blount
(74) *Attorney, Agent, or Firm*—Craig A. Hoersten; V. Lawrence Sewell

(57) ABSTRACT

The present invention provides an apparatus, system and method of increasing port availability for a communication switch. First, second and third M port crossbars are arranged to provide a crossbar with a increased number of ports available for the communication switch. K ports of a first M port crossbar are individually coupled to K ports of a second and a third M port crossbar via interconnect buses. Further, K ports of the second and third M port crossbars are individually coupled via interconnect buses resulting in L available ports on each the M port crossbars in which $M > L > K$.

8 Claims, 2 Drawing Sheets

SWITCH ARCHITECTURE USING MULTIPLE CROSSBARS

BACKGROUND OF THE INVENTION

1. Technical Field of the Invention

The present invention relates to communication switches and, more particularly, to an ethernet switch architecture.

2. Description of Related Art

Ethernet is the most popular physical layer LAN technology in use today. Ethernet is popular because it strikes a good balance between speed, cost and ease of installation. These benefits, combined with wide acceptance in the computer marketplace and the ability to support virtually all popular network protocols, make Ethernet an ideal networking technology. The Institute for Electrical and Electronic Engineers (IEEE) defines the Ethernet standard as IEEE Standard 802. This standard defines rules for configuring an Ethernet network as well as specifying how elements in an Ethernet network interact with one another.

In a communications device, such as a network switch, data units are received on ports which are typically coupled to a switch matrix, otherwise referred to as a crossconnect or crossbar. The received data units are forwarded from the respective ports of the crossbar switch to one or more other ports coupled to the crossbar switch. In a typical network switch, the ports are disposed on printed circuit boards or chips and the crossbar switch is likewise disposed on a chip.

A crossbar switch has the characteristics of being able to effectively couple an input data stream appearing at any specified one of the crossbar switch ports to one or more crossbar switch output ports.

As communication systems evolve toward using embedded switches as a backbone, it becomes necessary to be able to extend the connectivity to this backbone. One approach is to aggregate lower level ethernet links into higher level aggregation switches. Within a telecom system, rack space is at a cost premium. Therefore, it is beneficial from a cost, power, and management perspective to provide a maximum number of ports into the minimum rack space. Generally, single unit ethernet switches offer a total of 12 ports which limits the number of ethernet links (additional racks) that can be aggregated. Thus, the number of expansion racks in a Soft-Switch, for example, are limited by the availability of only 12 ports.

A commonly used crossbar chip is the GT-48304 12 port crossbar by Galileo Technologies, a Marvell Company. As interconnects are increased, the design complexity inhibits the manufacture of crossbar chips with more port availability, thus, larger and more expensive solutions (e.g. a multi-card chassis) are used to increase port density. Therefore, there exists a need for a novel architecture for increasing port availability with more acceptable cost, power and space requirements.

SUMMARY OF THE INVENTION

The present invention achieves technical advantages of an apparatus, system and method of maximizing the number of ports for a communication switch. First, second and third M port crossbars are arranged to provide a crossbar with an increased number of ports available for the communication switch. K ports of the first M port crossbar are coupled to respective sets of K ports of second and third M port crossbars via interconnect buses. Further, K ports of the second and third M port crossbars are coupled together via interconnect buses, resulting in L ports on each the M port crossbars remaining available for input and output signaling to and from the communication switch, in which M>L>K.

BRIEF DESCRIPTION OF THE DRAWINGS

For a more complete understanding of the present invention, reference is made to the following detailed description taken in conjunction with the accompanying drawings wherein:

FIG. 3 illustrates an ethernet switch with ethernet controllers coupled to each port of the 18 port crossbar illustrated in FIG. 2.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Port density in switching has become a high priority in most communication system designs. That is to say, increasing port density for fast ethernet and gigabit ethernet, for example, while maintaining the same rack space 1.0–1.5 U form factor with 19 inch rack-mount form factor currently used in the industry) as current 24+2 systems (24 fast ethernet ports with two gigabit ethernet uplinks) has become the battleground for future switching systems.

Figure 1:
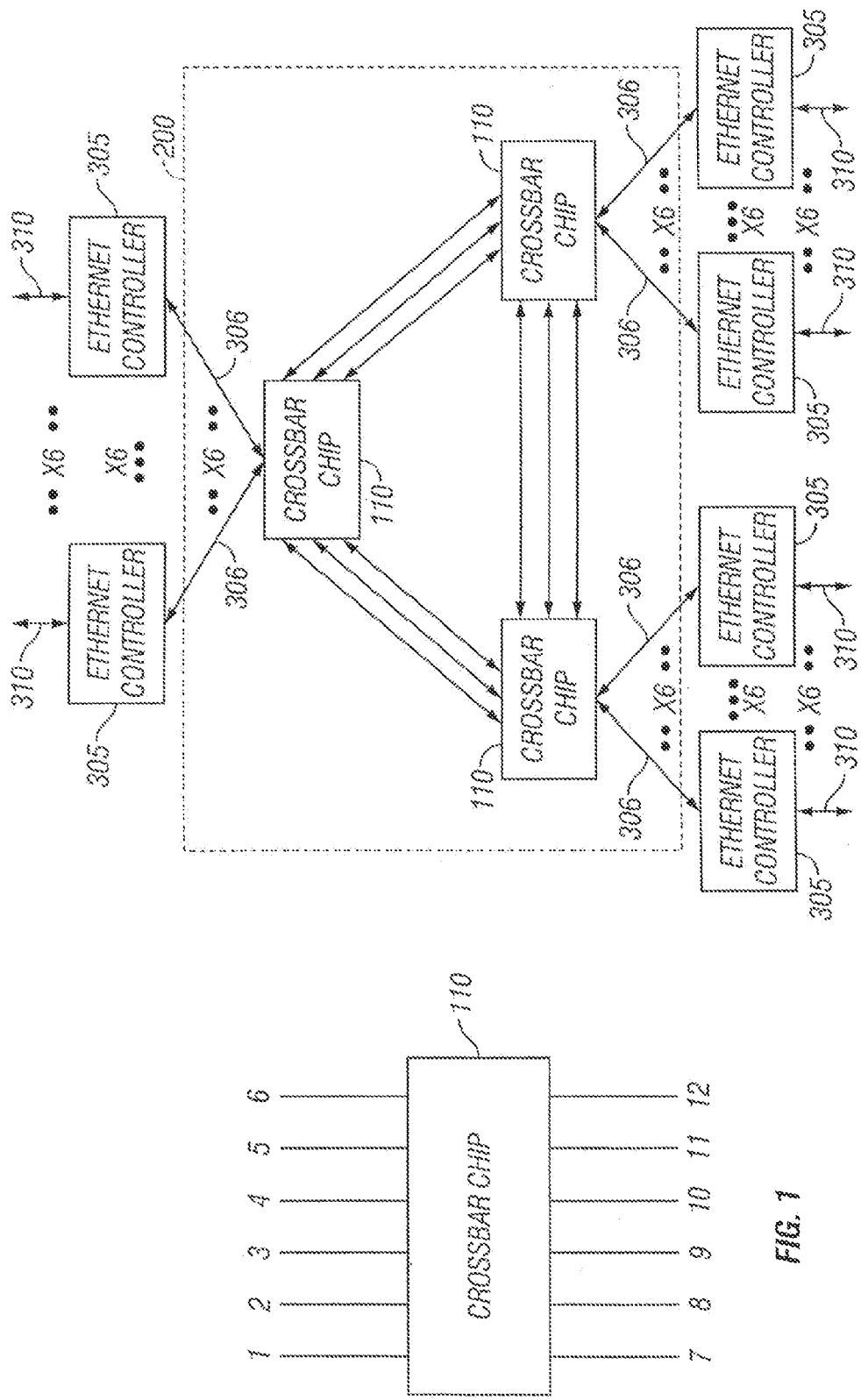
FIG. 1 illustrates an integrated 12 port crossbar chip.

Some systems currently provide 12 port gigabit ethernet switches in a 1.0–1.5 U form factor with the 19 inch rack-mount form factor utilizing a 12 port crossbar chip such as shown in FIG. 1 as item 110, for example, Galileo Technology's advanced GT-48304. The ports are numbered as 1–12. Though this arrangement can be realized in 1U form factor, it is limited to 12 ports of full wire speed gigabit ethernet. Further, current solutions greater than 12 ports must generally be implemented within a multi-card chassis which is expensive and typically occupies more than 4 U form factor within the 19 inch rack-mount form factor.

Figure 2:
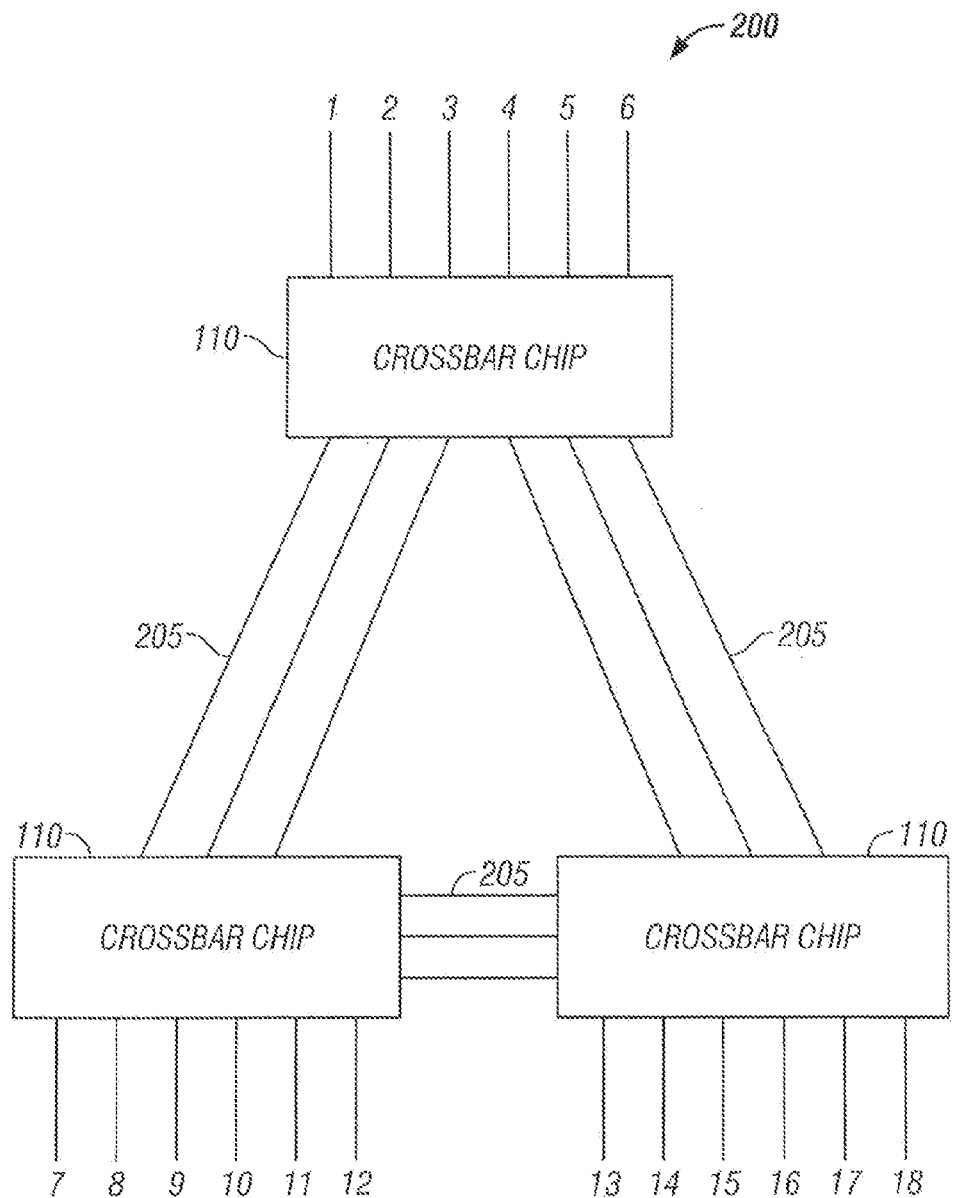
FIG. 2 illustrates an arrangement of 12 port crossbar chips interconnected to form an 18 port crossbar in accordance with an exemplary embodiment of the present invention.

Referring now to FIG. 2, there is illustrated an 18 port crossbar architecture 200 in accordance with an exemplary embodiment of the present invention. The external connection ports are numbered 1–18. Three 12 port crossbar chips 110 are arranged in a 3-way interconnected configuration which advantageously increases the port availability while minimizing impact to throughput and number of crossbars. Six separate ports from each of the 12 port crossbar chips are used for interconnects to the other 12 port crossbar chips resulting in an 18 port crossbar 200.

More particularly, three ports from a first 12 port crossbar chip 110 are individually coupled to three respective ports on a second 12 port crossbar chip 110. Three other ports on the second crossbar chip are individually coupled to three respective ports on a third crossbar chip 110. Further, three other ports of the third crossbar chip are individually coupled to three respective further ports on the first crossbar chip. Thus, six ports remain available on each of the 12 port crossbar chips (for a total of 18 available ports). An input at any of the 18 ports can be routed to any of the other 17 ports, via one or more of the crossbars. Compatible chip-to-chip or box-to-box buses 205 are used to interconnect the individual ports.

In at least one embodiment, Galileo Technology's advanced GT-48304 12 port crossbar chip is used for each of the crossbar chips 110. Further, in some embodiments, a compatible conventional Galileo Technology G.Link bus is used to interconnect the ports in the aforementioned manner. This arrangement of GT-48304 chips advantageous results in an 18 port crossbar. It should be appreciated that similar Galileo 12 port crossbar chip models can be incorporated into an embodiment of the present invention as can be similar 12 port crossbar chips from other chip manufacturers.

Currently, Galileo Technology offers a compatible G.Link bus operating at approximately 2.88 Gbits/sec full duplex (approximately 1.44 Gbits/sec for each communication direction) for chip-to-chip connection. In an embodiment using the GT-48304 chip and the 2.88 Gbits/sec G.Link bus, it can be seen that the resultant 18 port crossbar can experience some blocking. To determine if a switch is blocking or non-blocking, take a switch's specification and add up all the ports at theoretical maximum speed to obtain the theoretical sum total of the switch's throughput. If the switching bus or other components cannot handle the theoretical total of all output ports, the switch is considered a "blocking switch". For most applications, a blocking switch can be designed to have acceptable and reasonable throughput level.

For example, an eight port 10/100 switch can theoretically handle 200 Mbits/sec (full duplex) for each port for a theoretical total of 1600 Mbits/sec or 1.6 Gbits/sec. However, if it is determined that actual conditions require only 50% utilization of each port, then a 800 Mbits/sec switching bus is adequate.

Theoretically, an 18 port gigabit switch can handle 2 Gbits/sec (full to duplex) for each port for a total of 36 Gbits/sec. A 50% utilization of each port would require only a 18 Gbits/sec switching bus.

The switching bus of the ethernet switch illustrated in FIG. 2 has a throughput of approximately 26 Gbits/sec (full duplex) versus the theoretical 36 Gbits/sec. While the illustrated switch does experience some possible blocking, the novel bus arrangement has enabled a port count increase from 12 to 18 ports while minimizing the impact to throughput and need for additional crossbars.

Referring now to FIG. 3, there is illustrated an ethernet switch including an 18 port crossbar arrangement in accordance with an exemplary embodiment of the present invention. Three GT-48304 crossbar chips 110 are interconnected as aforementioned via compatible 2.88 Gbits/sec G.Link buses advantageously resulting in an 18 port crossbar 200 as illustrated in FIG. 2. Each of the 18 ports can be coupled to ethernet controllers 305. This expanded flexibility enables more expansion racks to be added, for example, to a softswitch without having to add more aggregation switches.

In at least one embodiment, the ethernet controllers 305 comprise Galileo Technology's gigabit ethernet controllers such as Galileo Technology's GT-48360. A GT-48360 can be coupled to each of the 18 available ports via an appropriate G.Link bus 306. Each ethernet controller 305 can subsequently be coupled to the switch fabric at 310 through, for example, a PHY communication layer. This advantageous arrangement of ethernet controllers and 12 port crossbar chips provides a minimally blocking 18 port gigabit ethernet switch with a minimum number of 12 port crossbar chips. Also, the ethernet switch of the present invention is configurable in a conventional 1.0–1.5 U rack space.

Although an 18 port gigabit switch architecture is realized in the foregoing examples using 12 port crossbars that each have a total of 6 ports connected to other 12 port crossbars, leaving 6 ports available on each 12 port crossbar, the invention can be used to realize other multi-port architectures using M-port switches that each have a total of (2×K) ports connected to other M-port switches, leaving L ports available on each M port switch, where M>L>K. So, in the illustrated embodiments, M=12, L=6 and K=3.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An ethernet switch assembly comprising:
a multiple port crossbar switch including first, second, and third crossbars, each of said first, second, and third crossbars including M ports and a switch matrix capable of switching ethernet data from one of its ports to another of its ports, and a plurality of interconnect buses, a first set of K ports of said first crossbar coupled to a first set of K ports of said second crossbar through K of said interconnect buses, a second set of K ports of said first crossbar coupled to a first set of K ports of said third crossbar through K of said interconnect buses, and a second set of K ports of said second crossbar coupled to a second set of K ports of said third crossbar through K of said interconnect buses, wherein L ports of each of said first, second and third crossbars are available as ports for said multiple port crossbar switch, and wherein M>L>K, and (3×L)>M, so that the number of external ports of the multiple port crossbar switch is increased beyond the number of ports of each of the first, second, and third crossbars; and
a plurality of ethernet controllers each having a first input coupled to a respective one of said available ports of said multiple port crossbar switch via an interconnect bus.

2. The ethernet switch assembly of claim 1, wherein M=12, L=6 and K=3.

3. The ethernet switch assembly of claim 1, wherein each of said plurality of ethernet controllers further have an output coupled to a PHY communication layer.

4. The ethernet switch assembly of claim 1, wherein one of said interconnect buses comprises a full duplex bus operating at approximately 2.88 Gigabits/second.

5. The ethernet switch assembly of claim 1, wherein each of said first, second and third crossbars is a 12-port crossbar chip.

6. The ethernet switch assembly of claim 1, wherein one of said interconnect buses is a chip-to-chip bus operating at 2.88 Gigabits/second full duplex.

7. The ethernet switch assembly of claim 1, wherein each of said interconnect buses is a chip-to-chip interconnect bus.

8. The ethernet switch assembly of claim 1, wherein each of said interconnect buses coupling said crossbars is a chip-to-chip interconnect bus.

* * * * *